April 6, 1937.      A. F. WHITE      2,076,310
CONSTANT EXPANSION PISTON RING EXPANDER Filed May 31, 1934

Inventor
A. F. WHITE
By Hazard and Miller
Attorneys.

Patented Apr. 6, 1937

2,076,310

UNITED STATES PATENT OFFICE 2,076,310

CONSTANT EXPANSION PISTON RING EXPANDER

Arthur F. White, Fullerton, Calif., assignor of one-half to John A. Vertson, Brea, Calif.

Application May 31, 1934, Serial No. 728,355

6 Claims. (Cl. 309—41)

This invention relates to improvements in pistons and particularly to the piston ring assemblies used thereon. In certain types of pistons, such as, for example, pistons used on pumps and compressors, the conventional practice is to employ a segmental ring, namely, a ring divided into a plurality of arcuate segments. Usually three segments are employed, although another number of segments is sometimes used. In such constructions difficulty has been experienced in providing an expanding means which expands the segments against the cylinder walls. While a large number of expansion means have heretofore been employed the difficulties usually experienced may be briefly described as follows:

If the spring is sufficiently strong to urge the segments outwardly against the cylinder walls with the desired force to prevent leakage a slight amount of wear, either on the segments or the cylinder wall, will exhaust or nearly exhaust the expansion effort of the spring so that this slight amount of wear will shortly allow the segments to move outwardly a sufficient distance so that the spring is no longer capable of keeping the segments tightly pressed against the cylinder wall. In other instances, if a very strong spring is used to overcome the effect produced by the wear the spring is so strong as to greatly increase the friction of the piston on the cylinder wall, resulting in a loss in efficiency.

An object of the present invention is to provide an improved expansion means for segmental piston rings which is of such design as to have a substantially constant expansion effort regardless of whether the segments of the ring are in their innermost positions, such as is the case on initial installation, or when in outermost positions, as is the case where the segments and cylinder walls have become badly worn. In this way by having the design such as to create a constant expansion effort in all positions the segments will not be urged outwardly with such force on initial installation as to greatly increase the friction and at the same time they will be urged outwardly with substantially the same force after the segments and cylinder walls have become worn.

A further object of the invention is to provide an extension means for segmental piston rings which is of heavy, simple, and durable construction and which will facilitate the installation of a segmental ring on a piston and its insertion in a cylinder.

With the foregoing and other objects in view, which will be made manifest in the following detailed description, and specifically pointed out in the appended claims, reference is had to the accompanying drawing for an illustrative embodiment of the invention, wherein:

Figure 1:
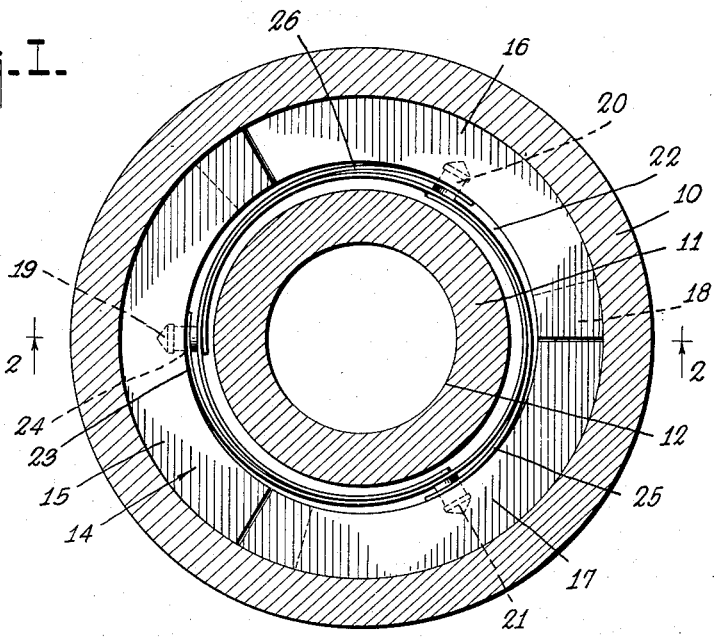
Fig. 1 is a vertical section through a cylinder and through a piston disposed therein, the section being taken through the ring groove on the piston to illustrate the installation of the improved ring and its expansion means.

Referring to the accompanying drawing, wherein similar reference characters designate similar parts throughout, the cylinder of a pump, compressor or the like is indicated at 10, within which there is disposed a piston 11 which may have a central bore 12 therethrough providing for the insertion of a piston rod. The piston is shown as having a ring groove 13. The piston ring is generally designated at 14 and in conformity with general practice this ring is divided into three arcuate segments 15, 16, and 17. These segments have stepped or lapped ends, as are indicated at 18. The segments cooperate to form a complete ring which is expansible against the walls of cylinder 10.

Figure 2:
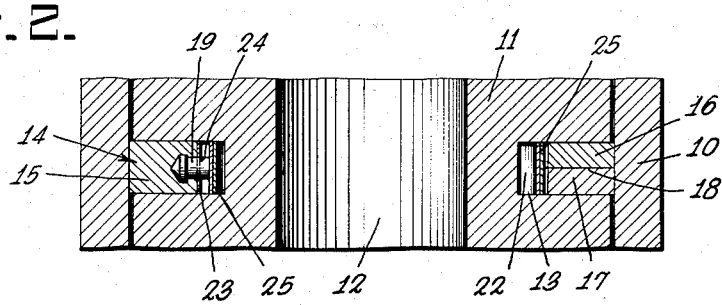
Fig. 2 is a section taken substantially upon the line 2—2 upon Fig. 1.

In the form of construction disclosed in Figs. 1 and 2 each segment has a small pin secured thereto on its inner face at about its center. The inner face of each segment may be drilled and the pin inserted therein so as to project inwardly a short distance from its inner face. The pin for segment 15 is indicated at 19 and the pins for segments 16 and 17 are indicated at 20 and 21, respectively.

A plurality of springs are provided which occupy the clearance space 22 between the inner face of ring 14 and the back of ring groove 13. Each spring is in the form of a straight, flat strip of spring steel which can be flexed into circular form but which tends normally to assume a flat position. Each spring, in the form of construction shown in Figs. 1 and 2, is anchored at one end to its respective segment; for this, end spring 23 has an aperture 24 to receive the inwardly projecting end of pin 19. In a similar manner spring 25 has an aperture at one end which receives pin 21 on segment 17. Likewise, spring 26 has an aperture which receives the inwardly projecting end of pin 20 on segment 16. Each spring is preferably equal in length to the inner circumference of two segments. In other words, spring 23 extends from pin 19 across the inner face of segment 17 and across the anchored end of spring 25 and terminates on the inner face of spring 25 opposite the inner face of segment 16 adjacent pin 20. In a like manner, spring 25 extends from pin 21 around the inner face of segment 16, across the inner face of spring 26, and terminates adjacent pin 19. Spring 26 extends from pin 20 across the inner face of segment 15, across the inner face of spring 23, and terminates near pin 21. As the three springs, one for each segment, tend to assume flat positions they will cooperate with each other in urging the segments 15, 16, and 17 outwardly against the walls of cylinder 10. There are three expansive efforts exerted by each spring on each segment. For example: segment 15 is urged outwardly by the anchored end of spring 23, the center of spring 26 which bears on the end of the pin 19, and the end of spring 25. In a similar manner segments 16 and 17 are urged outwardly by the sum of the efforts exerted by each of the three springs. The arrangement is such as to exert a substantially constant outward force on the three segments regardless of whether the segments are in their innermost positions, as is the case when initially installed, or when they are in their outermost positions, as is the case after severe wear. In this way the piston ring segments will always be kept tightly pressed against the cylinder walls but at no time will there be such extreme pressure as to materially increase friction.

It will be noted that each spring extends more than half way around the circumference of the piston ring groove so that each spring when flexed is somewhat semi-circular in form. This results in the spring pressing segments outwardly, the effective length of the spring being the diameter across the ring groove. With an effective length of spring this long it will be appreciated that the change in position of the spring from that when the segments are initially installed and that when the segments have become worn is very slight and this results in the exertion of substantially uniform pressure on the segments when they are initially installed and during all periods of wear.

I find that an extremely tight joint is formed and maintained between the piston and the cylinder walls at all times. In the case of a steam pump even after a long period of use I find that on closing the outlet valve from the pump that the pump will be brought to a standstill, indicating that the ring seal between the piston and the cylinder walls is kept very tight. In other constructions of which I am aware I find that the pump will still continue to operate slowly under like conditions, indicating that in prior constructions after there has been wear leakage takes place past the piston rings.

Figure 3:
Fig. 3 is a view in side elevation of a spring, illustrating the alternative form of construction that may be employed.

The particular manner in which the springs are anchored to their respective segments may be varied and to this end I have illustrated in Fig. 3 an alternative form of construction wherein the spring indicated at 30, instead of having an aperture at its end, has a small boss or button 31 spot welded or otherwise formed thereon which is adapted to enter an aperture formed on the inner face of its respective segment. In other words, instead of driving a pin, such as pin 19, into the hole on the inner face of the segment and positioning the apertured end of the spring thereon, the pin 19 may be left out and button 31, which is carried by the spring itself, may be inserted in the hole. Any other suitable means for anchoring the springs on their respective segments may be employed if desired.

From the above described construction it will be appreciated that the improved piston ring assembly may be very easily, quickly, and cheaply constructed and installed. Furthermore, the arrangement is such as to have an extreme flexibility of the spring expansion means, namely, a small outward movement of the segments produced by wear or by their conforming to an expanded cylinder does not exhaust the expansion of the spring but, instead, the expansive effort created by the spring is substantially the same in all positions.

I claim:

1. A piston having a ring groove, a segmental ring in the ring groove, and a plurality of springs between the ring and the back of the ring groove, each spring being flexed but tending to straighten and being anchored to the inner side of its respective segment, each spring extending laterally across the inner face of an adjacent segment.

2. A piston having a ring groove, a segmental ring in the ring groove, and a plurality of springs between the ring and the back of the ring groove, each spring being flexed but tending to straighten and being anchored to the inner side of its respective segment, each spring extending laterally across the inner face of an adjacent segment and across the inner face of the spring anchored thereon terminating on the inner face of the spring of the adjacent segment opposite the inner face of a third segment.

3. A piston having a ring groove, a segmental ring in the ring groove, and expanding springs between the segmental ring and the ring groove, each expanding spring being flexed and tending to straighten and extending at least half way around the ring groove, each expanding spring being anchored to its respective segment.

4. A piston having a ring groove, a segmental ring in the ring groove, and a plurality of normally straight, flexed springs between the segmental ring and the back of the ring groove, each spring extending approximately two-thirds around the ring groove, and the springs overlapping each other.

5. A piston having a ring groove, a segmental ring in the ring groove, and a plurality of normally straight, flexed springs between the segmental ring and the back of the ring groove, each spring extending approximately two-thirds around the ring groove, and the springs overlapping each other, each spring being anchored at one end to its respective segment.

6. A piston ring assembly comprising a segmental ring, and a plurality of normally straight flexed springs disposed within the ring, each spring extending at least half way around the inner circumference of the ring and tending to straighten.

ARTHUR F. WHITE.